United States Patent [19]

Kofoed

[11] Patent Number: 4,691,953
[45] Date of Patent: Sep. 8, 1987

[54] SHEET GRIPPER TONGS

[76] Inventor: Bruce O. Kofoed, 7347 Elmridge Dr., Dallas, Tex. 75240

[21] Appl. No.: 852,191

[22] Filed: Apr. 15, 1986

[51] Int. Cl.$^4$ .............................................. B25J 1/02
[52] U.S. Cl. .................................... 294/19.1; 294/34; 294/103.1; 354/345
[58] Field of Search ..................... 294/6, 8.5, 11, 19.1, 294/22, 23, 23.5, 34, 50.9, 100, 103.1, 104, 902; D16/36; 354/340, 343, 345–347

[56] References Cited

U.S. PATENT DOCUMENTS

| | | | |
|---|---|---|---|
| 307,410 | 10/1884 | Power | 294/22 |
| 389,195 | 9/1888 | Charpentier | 294/103.1 |
| 650,660 | 5/1900 | Schoonmaker | 354/347 |
| 1,158,637 | 11/1915 | Chorvath et al. | 294/8.5 |
| 1,260,302 | 3/1918 | Barrows . | |
| 1,724,435 | 8/1929 | Studwell | 294/19.1 |
| 2,099,588 | 11/1937 | Annema | 294/103.1 |
| 2,149,630 | 3/1939 | Richter | 95/100 |
| 2,191,010 | 2/1940 | Dahlquist | 294/103.1 X |
| 2,381,765 | 8/1945 | Martinek | 95/100 |
| 2,803,484 | 8/1957 | Puckett | 294/19.1 X |
| 2,992,848 | 7/1961 | Livensparger | 294/34 |
| 3,667,798 | 6/1972 | Rusztowicz | 294/19.1 X |
| 3,918,757 | 11/1975 | Huber | 294/50.9 |

FOREIGN PATENT DOCUMENTS 573752  6/1924  France ................................ 294/11

OTHER PUBLICATIONS

Advertisement "Kostiner Stainless Steel Tongs".

Primary Examiner—Johnny D. Cherry
Attorney, Agent, or Firm—Hubbard, Thurman, Turner & Tucker

[57] ABSTRACT

A portable tongs construction for the gripped handling of sheet materials that is comprised of a tubular handle internally containing a slidable plunger. Detachably supported at the common distal ends of both the handle and plunger are individual jaw units having opposed gripper faces arranged so as to enable lateral receipt of a sheet edge intervening therebetween. The plunger is spring biased relative to the handle to optionally effect either a normally open or normally closed operation of the jaw faces and is actuated via a finger button slightly raised from the surface of the handle. The jaw units are optionally replaceable so as to optimize suitability as is at least one of the gripper faces contained on one or other of the jaw units.

13 Claims, 6 Drawing Figures

U.S. Patent     Sep. 8, 1987     4,691,953
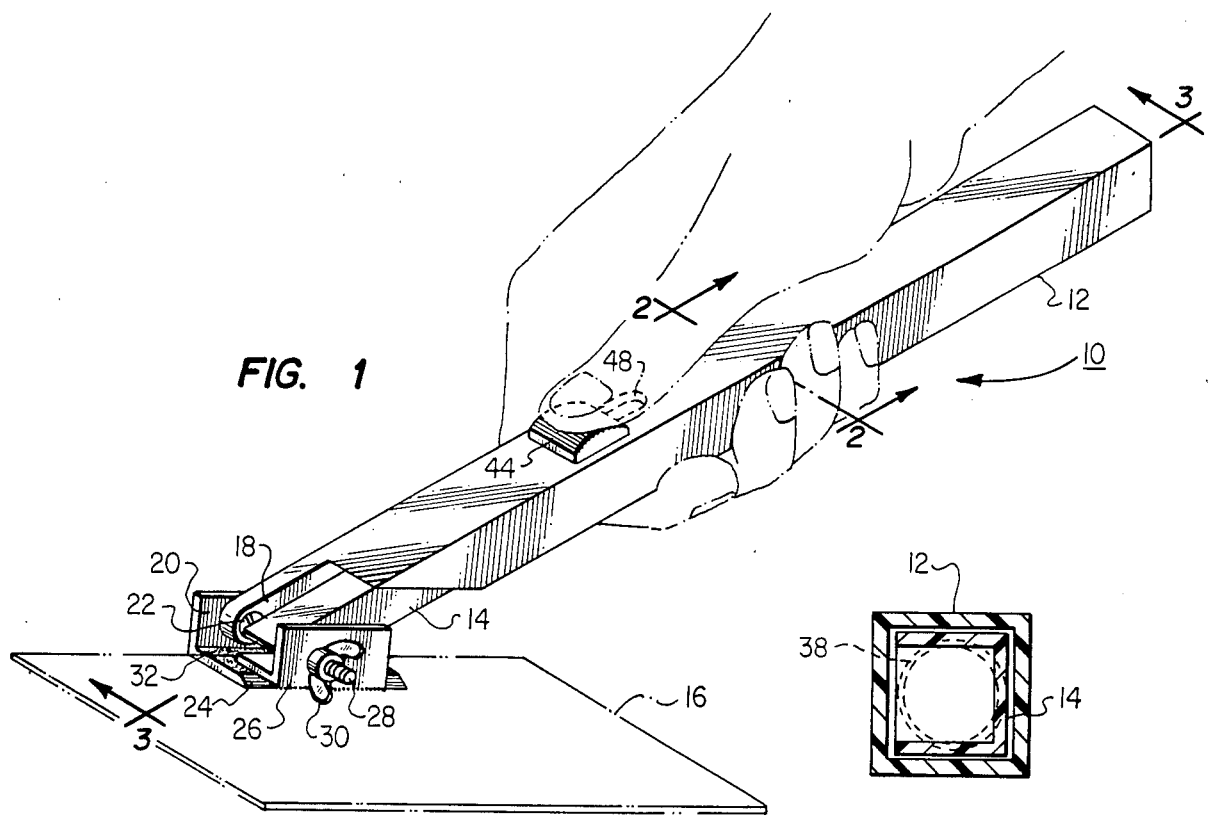
FIG. 1
FIG. 2
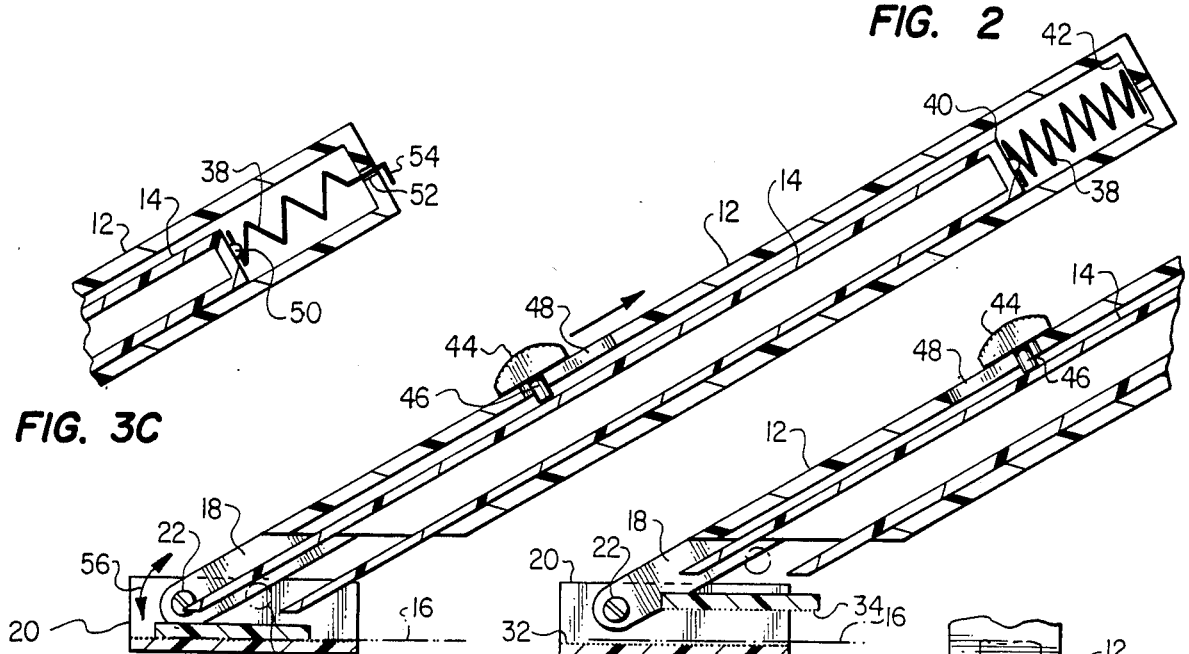
FIG. 3C
FIG. 3A
FIG. 3B
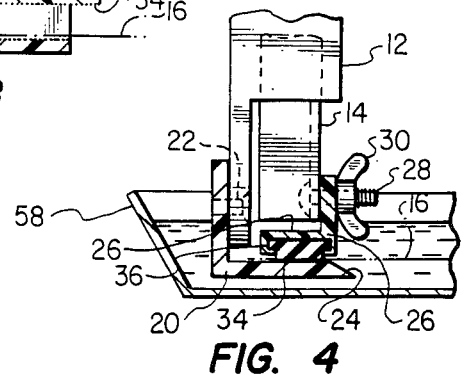
FIG. 4

SHEET GRIPPER TONGS

TECHNICAL FIELD

The technical field to which the invention relates comprises the field of tong apparatus for handling individual sheet materials as might be utilized as accessory equipment for sheet handling in the darkroom of a photographic processing laboratory.

BACKGROUND OF THE INVENTION

Tongs of various types are commercially available in a variety of sizes and for a variety of different applications. Generally such tongs comprise either the tweezer type as might for example be utilized for philatelic purposes or the scissors type normally employed for the gripping and handling of relatively heavier items. In the photographic darkroom, tongs of both types are utilized for handling of sheet film or prints to or from developer trays or the like. For that purpose not only must the tongs be capable of grasping the sheet without distorting or marring the surface but must also be of a composition substantially resistant or inert to the processing chemicals being employed.

Most commonly employed in the photographic darkroom is the tweezer type tongs comprising a pincer-like implement formed of treated tongue depressor type wood sticks. A tweezer type tongs is exemplified by U.S. Pat. No. 1,260,302. The open or claw ends of the opposed sticks are each provided with a rubber or plastic sleeve tip having a knurled, beaded or generally abraded surface texture on the gripping faces that enhances gripping of the film or print sheets, Other available tweezer types specifically marketed for these purposes are constructed of stainless steel having a beaklike formation at the pincer end. A controlled release is provided in the event excess finger pressure is applied. Still another tong marketed for these purposes is a spring bias scissors construction with or without sleeve tips as above.

While the foregoing tong types generally function well in the photographic darkroom environment, each differs from the others in the advantages they afford and which accounts for the preferences between them among darkroom technicians. At least one serious deficiency, however, common to all of the foregoing is the associated difficulty in trying to grasp a film or print sheet after it has settled near the bottom or edge of the photographic processing tray. It will be appreciated that the relative orientation of such tongs on being hand held at a location elevated above the tray renders it most difficult to insert one end of the tongs beneath the sheet edge in order to obtain a grasp thereof.

Another drawback is the permanency of the gripping surfaces that cannot conveniently be varied to more readily accommodate different sheet surface properties and thicknesses. Moreover, the inability to interchange tip constructions can render the tongs unsuitable for use with certain chemical contacts thereby severely restricting use of the tongs to only those specific applications with which they are strictly compatible.

Despite recognition of the foregoing problems, a ready solution therefor has not heretofore been known.

SUMMARY OF THE INVENTION

This invention relates to tongs for the edge gripping of sheet materials. More specifically, the invention relates to a novel tongs construction having substantially greater versatility than tongs previously available for the grasping of sheet materials from a hand held orientation inclined relative to the sheet plane.

The foregoing is achieved in accordance herewith utilizing a portable tong construction having an elongated tubular sleeve-like handle suitable for hand holding and which at its distal end detachably supports a laterally extending half of a jaw unit having a gripper face. Slidably contained within the handle is a spring biased plunger which at its distal end detachably supports the other half of the jaw unit having a gripper face opposite and adapted to cooperate with the first gripper face for the gripping of sheet materials. One or both of the jaw faces may be abraded or otherwise selectively textured in an enhanced gripping formation. Also, at least the second jaw face can per se be replaceable and/or suitably shaped of a selected geometric configuration most suitable for the specific application for which the tongs are to be utilized.

In a preferred construction, sheet grasping of the sheet edge is effected between the jaw units in a lateral motion of the handle with the jaws open prior to clamping. The distal edge of the lowermost jaw half has a bevel shaped leading lip for displacing the sheet edge upward for lateral receipt thereover. This enables sheets near the bottom or edge of a processing tray to be readily grasped in a superior manner as compared to such tong constructions previously available.

In accordance with an important aspect of the invention one or both of the components forming the separate jaw units are readily detachable so as to permit random substitution of jaw faces of different shape and composition most nearly compatible with its intended purpose.

In another important aspect of the invention, the gripper surface of one or both of the individual jaw faces can be readily interchanged without detaching and/or substituting the jaw per se so as to optimize a gripping texture and/or chemical compatibility with a minimum of effort.

In still another important aspect of the invention, the spring bias applied to the internal plunger can optionally be operable to effect either a normally closed position or a normally open position of the opposed jaw faces. For the former relation, the spring is secured in compression between the plunger and the handle and for the latter, the spring is secured in tension between the plunger and the handle. By rendering this feature interchangeable, it can be readily altered to accommodate individual preference.

It is therefore an object of the invention to provide a novel tong construction for grip handling of sheet materials.

It is a further object of the invention to effect the previous object with a tongs particularly suitable for the handling of sheet materials in the darkroom of a photographic processing laboratory.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIG. 1 is an isometric view of the tongs of the invention;

FIG. 2 is a sectional view as seen substantially from the position 2—2 of FIG. 1;

FIG. 3A is a sectional view as seen substantially from the position 3—3 of FIG. 1 of the tongs in its clamping or gripping relation;

FIG. 3B is a partial sectional view as seen substantially from the position 3—3 of FIG. 1 for the tongs in its release or open relation;

FIG. 3C is a fragmentary sectional view illustrating an alternative construction to the construction of FIG. 3A; and FIG. 4 is a sectional view as seen substantially from the position 4—4 of FIG. 3A and disclosing an optional grip replacement feature therefor.

DESCRIPTION OF THE PREFERRED EMBODIMENT

In the description which follows, like parts are marked throughout the specification and drawings with the same reference numerals, respectively. Drawing figures are not necessarily to scale and in certain view parts may be drawn rotated with the plane of the drawing for clarity.

Referring now to the drawings, the tongs in accordance herewith is designated 10 and is comprised of an elongated sleeve-like tubular handle 12 containing a slidable plunger 14. For purposes hereof, both the handle 12 and plunger 14 are of rectangular cross section and are of a synthetic composition such as polyvinyl chloride (PVC).

Detachably supported at the lower distal end of handle 12 contiguous to a longitudinal integral flange 18 thereof is an angle shaped half jaw unit 20 mounted on flange 18 via transverse screw 22. Formed at the lower leading edge of jaw unit 20 is a longitudinal beveled lip 24 for reasons as will be understood. For cooperating with jaw unit 20 there is provided an oppositely angled half jaw unit 26 mounted on the lower end of plunger 14 via a screw 28 and wing nut 30.

The half jaw units 20 and 26 each have a gripper face 32 and 34 respectively that are appropriately abraded or otherwise textured so as to enable an enhanced grip to be effected along the side border of sheet 16. As specifically illustrated in FIG. 4, the underface 34 of jaw unit 26 can be readily removed and substituted as appropriate by means of a dovetail support 36. Possible configurations might suitably be apex beveled or oval.

In the preferred mode, the jaw halves are relatively self actuated to the normally closed relation of FIG. 3A by means of a compressed coil spring 38 contained between the rear end face 40 of plunger 14 and the interior rear face 42 of handle 12. To actuate opening of the jaws in order to receive an edge portion of a sheet 16, there is provided a knurled upwardly displaceable button 44 having a stem 46 that extends through an elongated longitudinal slot 48 in the handle 12 where it is secured to the plunger surface thereat. Alternatively, for effecting relative self actuation in a normally open relation of the jaw halves, spring 38 is secured in tension (FIG. 3C) to one end of a loop 50 on the back face of plunger 14 and at the other end extends through aperture 52 in the rear face 42 of the handle at which it is connected to a loop 54. Movement of the jaw unit 26 is similarly effected via displacement of button 44 in a downward direction. To accommodate user comfort and convenience, both jaw units can be pivoted about their supported axes as indicated by arrow 56 to any desired presettable angular orientation relative to handle 12 considered comfortable by the user.

As already stated, the specific compositions of the various components should be consistent with the chemical compatibility of the intended tong use, if indeed that is a factor, and its gripping properties selected depending on the specific type characteristics of the sheeting 16 to be handled. Obviously, material cost is another important consideration and for darkroom photographic purposes, all components other than spring 38 and including the bolts and wingnuts etc. are PVC or at least PVC coated. Optionally, stainless steel bolts and nuts could be utilized and spring 38 is preferably of stainless steel at least where chemical contamination is likely. Other plastics and/or metals could be selected as would be most compatible with the particular environment in which the tongs are to be utilized.

In operation, with the jaw faces 32 and 34 spaced apart in a relatively open position, the tongs 10 are extended down to about the vicinity of the sheet 16 (see FIG. 4) after which the tongs are moved laterally toward the sheet in order to receive its borders intervening between the jaw faces. By closure displacement of jaw unit 26 via button 44, the border of sheet 16 is conveniently and reliably grasped in order to be easily transported elsewhere. As illustrated in FIG. 4, sheet 16 is contained in a developer tray 58 and in the event it is resting relatively close to the bottom, lip 24 of jaw half 20 can be utilized to conveniently raise this border edge while the tongs are moved laterally thereover.

By the above disclosure there has been described a novel construction for sheet handling tongs that affords a versatility thereto not previously available. Not only is engagement with the sheet to be grasped easier by virtue of the lateral displacement for receiving the sheet border between the jaw faces but by virtue of the detachable jaws and replaceable component gripping efficiency, the entire unit can virtually be custom optimized for any specific application for which the tongs are to be utilized. Such features have not previously been available as to afford the tongs of the instant construction an advance in the art of sheet material handling that readily overcomes the deficiencies of the prior art constructions noted above. It will likewise be apparent at the same time that the manufacture of such tongs readily lends itself to mass production and low cost so as to enable their ready purchase by all consumers having a need therefor.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A portable tongs for the gripped handling of sheet materials comprising in combination:
   (a) an elongated handle;
   (b) a plunger coaxially slidable relative to said handle;
   (c) opposed cooperable jaw faces for defining a gripping plane therebetween and displaceable between relatively open and closed positions, one of said jaw faces being contained on a first jaw unit supported at the lower distal end of said handle and the other of said jaw faces being contained on a second jaw unit supported at the lower distal end of said plunger;
   (d) actuator means to manually operate said jaw units relatively toward and away from each other between the closed and open positions respectively of their respective jaw faces; and (e) support means separately supporting each of said jaw units for rotatable displacement about a respective axis extending substantially normal to the longitudinal axis of said handle, said support means enabling arcuate displacement of the jaw faces and their effected gripping plane about the axes of said support means for presetting a preferred angular orientation between the gripping plane of said jaw units and the longitudinal axis of said handle.

2. A portable tongs according to claim 1 in which said handle is tubular and said plunger is contained within said handle.

3. A portable tongs according to claim 2 including spring means imposing a bias displacement of said plunger in a longitudinal direction relative to said handle and said actuator means is longitudinally displaceable in a direction opposite to the direction of said imposed spring bias.

4. A portable tongs according to claim 3 in which the cooperating faces of said jaw units when positioned relative to a sheet material to be gripped extend in a plane orientation generally parallel to the plane of the sheet to enable lateral receipt of the sheet edge therebetween.

5. A portable tongs according to claim 3 in which said spring means imposes a bias on said plunger in a direction for effecting a normally closed relation of said jaw faces.

6. A portable tongs according to claim 3 in which said spring means imposes a bias on said plunger in a direction for effecting a normally open relation of said jaw faces.

7. A portable tongs in accordance with claim 3 in which said jaw units are detachable connected to their respective support means to enable replacement thereof.

8. A portable tongs in accordance with claim 3 in which the jaw face of at least one of said jaw units is per se removable from its respective jaw unit.

9. A portable tongs according to claim 3 in which said handle includes an elongated slot and said actuator means comprises a displaceable knob connected to said plunger through said slot and situated outward of said handle.

10. A portable tongs in accordance with claim 1 in which one of said first and second jaw units is relatively lower than the other of said jaw units in relation to the under distal end of said handle.

11. A portable tongs in accordance with claim 10 in which the distal edge of the lower of the respective jaw units defines a beveled lip past which a sheet to be gripped is to be received.

12. A portable tongs in accordance with claim 1 in which the composition of the handle, jaw units and plunger is selected for chemical compatibility with the working environment in which the tongs are to be utilized.

13. A portable tongs in accordance with claim 12 in which at least said handle and said plunger are formed of a polymer plastic composition.

* * * * *